United States Patent [19]

Murphy

[11] Patent Number: 4,849,470
[45] Date of Patent: Jul. 18, 1989

[54] POLYURETHANE SYSTEMS ESPECIALLY ADAPTED FOR SURGE SUPPRESSION

[75] Inventor: Charles H. Murphy, St. Petersburg Beach, Fla.

[73] Assignee: Advanced Protection Technologies, Inc., Clearwater, Fla.

[21] Appl. No.: 264,836

[22] Filed: Oct. 31, 1988

[51] Int. Cl.$^4$ ............................................. C08G 18/34
[52] U.S. Cl. .................................................... 524/714
[58] Field of Search ................ 524/714, 731, 779, 786

[56] References Cited

U.S. PATENT DOCUMENTS

| | | | |
|---|---|---|---|
| 3,193,525 | 7/1965 | Kallert et al. | 521/128 |
| 3,296,190 | 1/1967 | Reischl et al. | 524/195 |
| 4,231,986 | 11/1980 | Brauer et al. | 264/272.11 |
| 4,355,130 | 10/1982 | Heinze | 524/491 |
| 4,533,598 | 8/1985 | Douney et al. | 428/380 |
| 4,596,743 | 6/1986 | Brauer et al. | 428/380 |

Primary Examiner—Maurice J. Welsh
Assistant Examiner—Loretta Henderson
Attorney, Agent, or Firm—Dominik, Stein, Saccocio, Reese, Colitz & Van Der Wall

[57] ABSTRACT

A polyurethane system especially adapted for surge suppression comprising the reaction product of:

A

1. Castor oil
2. A molecular sieve having the composition $M^1{}_{12}$ (Al $O_2)_{12}$ (Si $O_2)_{12}$, wherein $M^1$ is an alkali cation
3. Polydimethyl siloxane
4. Hindered phenol antioxidant
5. Tetraisopropyl diphenyl carbodiimide
6. 10, 10$^1$-oxybisphenoxarsine
7. Alumina trihydrate and

B 8. 4, 4$^1$ diphenylmethane diisocyanate;

the system having a Shore hardness of 80 to 90.

3 Claims, No Drawings

POLYURETHANE SYSTEMS ESPECIALLY ADAPTED FOR SURGE SUPPRESSION

FIELD OF THE INVENTION

Power surges, also known as spikes or transients, produce momentary variations in voltage. They can originate from external sources such as lightning or from internal sources like the inductive "kick" of a transformer, solenoid, or motor. These upsets are difficult to control.

The impact of surges is of growing concern because of the trend towards ever smaller micro circuits, devices and systems. These new systems based on fragile silicone chips and integrated circuitry are vulnerable to even very small deviations in voltage.

Unfortunately, many surges are anything but minute. Depending on the source, the amplitude of a surge can exceed thousands of volts. Even when the surge lasts only a few millionths of a second it can cause a computer to dump reams of data or damage expensive electrical and electronic equipment.

Accordingly, there have been many approaches to ameliorate the problem.

PRIOR ART

U.S. Pat. Nos. 4,231,986, 4,355,130, 4,596,743 and 4,533,598 disclose the use of polyurethanes including castor oil as the polyol reactant, for encapsulants usually employing the polyurethane in the prepolymer form. None deal with the special problem of surge suppression, or the specific formulations developed herein.

SUMMARY OF THE INVENTION

In accordance with this invention there is provided a specific polyurethane system especially adapted for surge suppression comprising the reaction product of:

A
1. Castor oil
2. A molecular sieve having the composition $M_{12}^1$ (Al $O_2)_{12}$ (Si $O_2)_{12}$, wherein $M^1$ is an alkali cation.
3. Polydimethyl siloxane
4. Hindered phenol antioxidant
5. Tetraisopropyl diphenyl carbodiimide
6. 10, $10^1$- oxybisphenoxarsine
7. Alumina trihydrate and B
8. 4, $4^1$ diphenylmethane diisocyanate;

the system having a Shore hardness of 80-90.

It is surprising and was unpredictable that this rather specific system provides surge suppression far improved over what is generally available. This is detailed below.

DETAILED DESCRIPTION OF THE INVENTION

The castor oil is employed in an amount of 30 to 40 parts by weight of the total A formulation. It is primarily composed of a triglyceride of ricinoleic acid and is available as DB Oil of high purity. It has a dielectric strength of 25° C. KV=33, and a high volume resistance at 100° C. of $20 \times 10^{10}$ ohm-cm.

The molecular sieve has the composition indicated above and is employed in amounts of 2 to 4 parts by weight. It is available in the trade as Baylith Powders and Pastes.

Polydimethyl siloxane is employed in an amount of 1.5 to 2.0 parts. It is typically available in the trade as Sag 47.

The hindered phenol antioxidant is employed in an amount of 0.15 to 0.25 parts. Irganox 1076 and 1010 are particularly effective.

Tetraisopropyl diphenyl carbodiimide is employed in amounts of 1.5 to 2.5 parts. It is available as STABAXOL I in the trade.

10, $10^1$ - oxybisphenoxarsine, conveniently in a 2% solution in poly (diethylene adipate) is employed in amounts of 1.5 to 2.5 parts. It is available in the trade as Vinyzene, BP-5-2U.

The alumina trihydrate is employed in A in an amount of from 35 to 60 parts.

Carbon black e.g. in the form of an industrial furnace black, e.g. raven 420 is also conveniently employed in A in an amount of 0.4 to 0.6 parts, preferably predispersed by ball milling in the castor oil.

All parts as used herein are by weight, unless stated to the contrary, free of diluent or carrier 4, $4^1$ diphenylmethane diisocyanate is available in the trade as Mondur CD. The diisocyanate is utilized and reacted in an amount of about 42 to 52 weight percent of the castor oil. The B diisocyanate is thus employed in the ratio of 4.5-5.5 parts A/1 part B. The ratio of 5 gives a particularly good product.

It should be noted that the 4—4' diphenyl methane diisocyanate is not a prepolymer but is low functional (f=2.1), has a free NCO of about 29.3% and an amine equivalent of about 143-144.

A is conveniently prepared by admixing the components in the order listed, at ambient temperature until smooth and homogeneous. The alumina trihydrate is admixed with high shearing e.g. with a Cowles or Hockmeyer blade.

The reaction conditions for reacting A and B are at ambient room temperature. Component A has a viscosity of approximately 8,000-10,000 cps (Brookfield Viscometer Spindle #4, 20 RPM). Component B has a viscosity of approximately 50 cps under similar conditions. When initially mixed at R/T ambient conditions at a A:B weight ratio of 5:1, the ensuing viscosity of about 1,800 cps is relatively stable for about 30 minutes; a semi-gel at about 60', and unpourable at 120'. Exotherm temperature with an average mass of about 500 grams is about 110°-115° F. within 2 hours at ambient room temperature conditions.

These reactions may be accelerated by the addition of fractional % by weight of organotin catalysts, e.g. butyltin mercaptide or dibutyltin dilaurate. Various aliphatic amines such as triethyene diamine and aromatic amines such as diethyl toluene diamine function as both catalysts and chain extenders.

The reaction product has a Shore hardness of 80 -90, preferably 85. It been found on an empiric basis that this provides the accommodation for the expansion of the embedded metal oxide varistors (MOV) as they heat and expand under service conditions.

The resultant polyurethane systems exhibit some heat sink capacity, thermoconductivity, dimensional stability, hydrolytic and thermal stability, meet flame resistance standards, have low exotherm temperature during the induction period, and reasonably low viscosity to accommodate commercial dispensing equipment.

This invention will be better understood by reference to the following examples:

EXAMPLE a repetitive test procedure was designed to apply a stressful duty cycle for surge suppression, employing an open circuit voltage of 4500 volts D.C. and a short circuit current of 4680 amps. The clamping voltage across the device under test is checked until the device under test declines 10%. This test exhibits excellent correlation with field performance.

The results are as follows from other commercial encapsulants and those claimed herein.

| Surge Suppression System | Time to Failure (Min.) |
| --- | --- |
| 1. Filled polysiloxane, Sylgard 170A-B | 5 |
| 2. Filled styrenated unsaturated polyester | 10 |
| 3. Polyurethane system of this invention | 50 |

These results demonstrate the marked superiority of the instant polyurethane systems.

The system can be upgraded and/or modified for applications such as ignition coils, electrical cable splicing, automotive electrical systems, circuit boards, closed coil torroidal transformers, ferrite core windings, electromagnetic switches with reed windings, etc.

It is to be understood that this invention is not limited to the specific examples which have been offered as particular embodiments and that modifications can be made without departing from the spirit thereof.

What is claimed is:

1. A polyurethane system especially adapted for surge suppression components comprising the reaction product of:

| | Parts by Weight |
| --- | --- |
| A. | |
| 1. Castor oil | 30 to 40 |
| 2. A molecular sieve having the composition $M_{12}^1 (Al\ O_2)_{12} (Si\ O_2)_{12}$, wherein $M^1$ is an alkali cation | 2 to 4 |
| 3. Polydimethyl siloxane | 1.5 to 2.0 |
| 4. Hindered phenol antioxidant | 0.15 to 0.25 |
| 5. Tetraisopropyl diphenyl carbodiimide | 1.5 to 2.5 |
| 6. 10, $10^1$ - oxybisphenoxarsine | 1.5 to 2.5 |
| 7. Alumina trihydrate | 35 to 60 |
| and B, wherein B is: | |
| 8. 4, $4^1$ diphenylmethane diisocyanate; | 16 to 24 |

The system having a Shore hardness of 80 to 90.

2. The system of claim 1 in which 4.5 to 5.5 parts of A/1 Part B are employed.

3. The system of claim 2 in which carbon black in an amount of from 0.4 to 0.6 parts is also utilized in A.

* * * * *